US007298501B2

(12) United States Patent
Christodoulou et al.

(10) Patent No.: US 7,298,501 B2
(45) Date of Patent: Nov. 20, 2007

(54) METHOD OF, COMPUTER PROGRAM FOR, AND SYSTEM FOR MAINTAINING PRINT SYSTEM MEDIA RESOURCES

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/160,405

(22) Filed: Jun. 4, 2002

(65) Prior Publication Data

US 2003/0016374 A1  Jan. 23, 2003

(30) Foreign Application Priority Data

Jun. 4, 2001  (GB) ................................. 0113562.3

(51) Int. Cl.
*B41J 1/00* (2006.01)
*G06F 15/00* (2006.01)

(52) U.S. Cl. .................. 358/1.12; 358/1.15; 358/1.16; 358/1.14; 358/1.1; 399/8; 399/9; 399/23; 399/24; 709/226; 709/203; 347/14; 707/10; 707/102

(58) Field of Classification Search ............... 358/1.12, 358/1.15, 1.14, 1.13, 1.16, 1.1; 395/111; 347/14; 399/8, 9, 23, 24; 707/10, 102; 709/203, 709/226
See application file for complete search history.

(56) References Cited

U.S. PATENT DOCUMENTS

| 5,081,595 | A  | * | 1/1992  | Moreno et al.   | 358/1.12 |
| 6,809,831 | B1 | * | 10/2004 | Minari          | 358/1.15 |
| 6,917,437 | B1 | * | 7/2005  | Myers et al.    | 358/1.15 |
| 6,999,190 | B2 | * | 2/2006  | Shimbori et al. | 358/1.15 |

FOREIGN PATENT DOCUMENTS

EP        1024100 A2    8/2000

* cited by examiner

*Primary Examiner*—Aung S. Moe
*Assistant Examiner*—Scott Schlack

(57) ABSTRACT

A computer network comprises plural computer systems connected to plural printers. Each computer system comprises at least one application program for generating print data for one or more of the printers. One of the computer systems is partially employed as a stock control computer. An application program stored on the stock control computer runs a model of the overall system, including maintaining an up-to-date schedule of all print jobs on the system, and maintains a log of all media resources (i.e., paper) available to each printer. The application program ensures that the printers have suitable media resources and/or that print jobs are allocated to printers where appropriate media resources are available, if possible.

28 Claims, 3 Drawing Sheets

METHOD OF, COMPUTER PROGRAM FOR, AND SYSTEM FOR MAINTAINING PRINT SYSTEM MEDIA RESOURCES

FIELD OF INVENTION

This invention relates to a method of, computer program for, and system for maintaining media resources in a print system.

BACKGROUND ART

Print systems, particularly those used in commercial environments, generally comprise one or more computers connected to a plurality of printers by means of some data link, for example, a computer network. The printers convert print data, generated in the computers, into hard-copy output. The computers will generally include one or more application programs from which print data is generated for output to one or more of the printers. The print data for a particular print 'job' usually comprises a page description language (PDL) file describing the physical content of the printable area, and a job description language (JDL) file for describing other attributes of the print job, such as the number of copies to be printed.

The processing of print jobs will involve the use of some medium onto which the print job will be produced, e.g. paper, cardboard, labels, acetate transparencies, envelopes. The type of media to be used will be specified in the JDL file attached to the print job. The JDL file may also further define the medium in terms of its type or weight, e.g. pink 100 gram paper, white 250 gram paper. Many printers also comprise some finishing apparatus, such as laminators, binders etc. The use of such apparatus will also require media, for example, laminating covers, binding spines and so on. Again, the fact that a print job should be processed on a printer having a particular finishing apparatus, and the media required for that finishing apparatus will be specified in the JDL file.

In order for a print system to work efficiently, it is important that a supply of the appropriate media is made available. Delays in printing caused by a lack of appropriate media can be costly in terms of failing to meet required deadlines. This is particularly important in commercial environments where time is an important factor and where customers specify a particular time when they would like the printing completed. Since it is difficult to predict the exact amount and type of the media required, and at what time, it is common practice for a relatively large amount of each media to be stored. This has disadvantages in that the media has to be bought in bulk, and requires large storage space, which can be expensive. This is further complicated by the fact that some types of media need to be stored under certain environmental conditions, e.g. at a certain humidity. In cases where a number of printers are used over a relatively large site, several storage areas may have to be provided.

SUMMARY OF THE INVENTION

According to a first aspect of the present invention, there is provided a method of maintaining media resources in a print system, the print system comprising a plurality of printers connected to at least one computer by a computer network, wherein the method comprises: maintaining a first computer model representing print jobs which are to be processed on the print system at some future time, the first computer model including job data relating to the media requirements of each print job; maintaining a second computer model representing the up-to-date state of media resources present at each of the plurality of printers; determining if one or more media resources specified in the job data will be available for the print jobs, based on analysis of job data in the first computer model and the media resources represented in the second computer model; and generating a computer notification in the event that one or more media resources will not be available for one or more of the print jobs, the notification acting as a prompt to acquire new media resources.

It will be understood that the terms "media" or "medium" are intended to cover all types of material or product which are used in forming the final hard copy output from a printer (including any finishing device used by a printer), examples of which have been given above.

By using a model of the current print jobs (i.e. print jobs currently stored on the system for processing at some future time) and their media requirements, and a model describing the current state of the available media on each printer, it is possible to predict at what time a particular media type will run-out for a given printer. By using this information for generating a computer notification (which is preferably performed automatically), this notification can be used to ensure that any future print jobs will not be delayed due to a lack of appropriate media, or at least that any delay will not have a major effect on the overall print system. In its simplest form, the notification is used to prompt the ordering of more media resources prior to the time when the media is likely to run out.

The first computer model may include a schedule specifying an ordered list of print jobs for processing at particular times, wherein the method may further comprise the step of determining whether the or each media resource specified in the job data will be available for each print job at the time specified for processing each print job in the schedule. In the event of a notification being generated indicating that the or each media resource required for a print job will be unavailable at the scheduled processing time for that print job, the method may further comprise altering the schedule so that the print job is processed at an earlier time when the or each required media resource will be available. To facilitate this, each print job may have an associated priority label indicating the relative importance of the print job, the step of altering the schedule thereafter comprising placing print jobs having a priority label indicating greater relative importance prior to print jobs having a priority label indicating less relative importance.

Thus, in this case, the computer notification is used to ensure that higher priority jobs are performed prior to less important jobs. Thus, in the event of a lack of appropriate media, important jobs will already have been processed, and the less important jobs can be stalled or re-directed to other devices.

The print job data may further specify a particular printer at which each print job is to be processed, and, in this case, in the event of a notification being generated indicating that the or each media resource required for a print job will be unavailable at the scheduled processing time for that print job, the method may further comprise altering the print data for that print job to specify a different printer at which the or each required media resource will be available at the scheduled processing time. In this case, the print job will be redirected to a different printer where the required media is actually available.

The method may further comprise inputting the computer notification to a stock control application program. The stock control application program may include an electronic ordering facility for automatically ordering media resources in response to the computer notification. Thus, where it is notified that the media is going to run-out at a particular time, it is possible to automatically order a new stock of media, preferably for delivery prior to the run-out time. This may be performed by simply printing off an order form for sending to a supplier, or may even comprise sending an electronic message to a supplier, e.g. by e-mail or fax.

The stock control application program may include a distribution facility for generating a plan of where particular media resources should be distributed. Thus, where a central store of media is kept on a site, if particular media will be required soon, then appropriate distribution from the central store is facilitated.

Preferably, the step of determining if one or more media resources specified in the job data will be available for the print jobs is performed in super real-time.

According to a second aspect of the invention, there is provided a computer program for maintaining media resources in a print system comprising at least one computer and a plurality of printers, the computer program comprising computer readable instructions for causing a computer system to perform the steps of: maintaining a first computer model representing print jobs which are to be processed on the print system at some future time, the computer model being adapted to include job data relating to the media requirements of each print job; maintaining a second computer model adapted to represent the media resources present at each of the plurality of printers; determining if one or more media resources specified in the job data will be available for one or more of the print jobs, based on analysis of the job data in the first computer model and the media resources represented in the second computer model; and automatically generating a computer notification in the event that one or more media resources will not be available for one or more of the print jobs.

According to a third aspect of the present invention, there is provided a print system comprising: a computer; and a plurality of printers, the computer being connected to the printers by a computer network, wherein the computer is arranged to: maintain a first computer model representing print jobs which are to be processed on the print system at some future time, the computer model including job data relating to the media requirements of each print job; maintain a second computer model representing the media resources present at each of the plurality of printers; to determine whether one or more media resources specified in the job data will be available for the print jobs, based on analysis of the job data in the first computer model and the media resources represented in the second computer model; and automatically generating a computer notification in the event that one or more media resources will not be available for one or more of the print jobs.

The above and still further objects, features and advantages of the present invention will become apparent upon consideration of the following detailed description of a specific embodiment thereof, especially when taken in conjunction with the accompanying drawings.

DETAILED DESCRIPTION OF THE DRAWING

Figure 1:
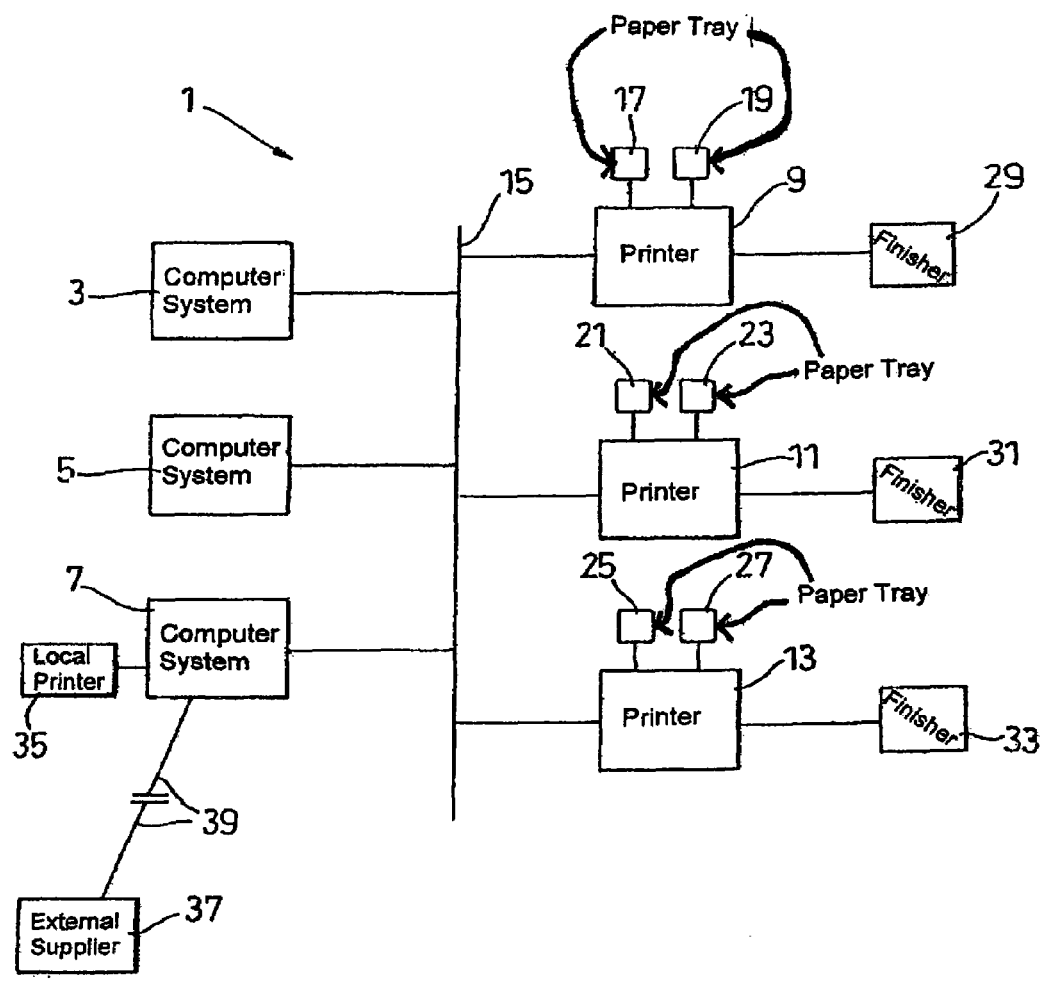
FIG. 1 is a block diagram representation of a computer network in the form of a commercial print system.

Referring to FIG. 1, a computer network 1 comprises first, second and third computer systems 3, 5, 7 connected to first, second and third printers 9, 11, 13 by means of a network connection 15. Each computer system 3, 5, 7 comprises at least one application program capable of generating print data for output to one or more of the printers 9, 11, 13. The print data are output from each application program and stored on a respective print spooler (not shown) forming part of each computer system 3, 5, 7.

Each printer 9, 11, 13 uses two separate media sources, in this case, paper trays. Specifically, the first printer 9 has a 100 gram paper tray 17 and a 250 gram paper tray 19. Similarly, the second printer 11 has a 100 gram paper tray 21 and a 250 gram paper tray 23, and the third printer 13 has a 100 gram paper tray 25 and a 250 gram paper tray 27. Whilst paper is the medium used in this embodiment, any known media type for printers can be used. Each printer 9, 11, 13 also has a finishing device. The first printer 9 has a glue binding finisher 29, the second printer 11 has a string binding finisher 31, and the third printer 13 has a glue binding finisher 33. Of course, other finishing devices could be employed, for example, staplers or laminators.

The third computer system 7 is partially employed as a stock control computer (for ease of explanation, the third computer system will hereinafter be referred to as "the stock control computer 7"). An application program is stored on the stock control computer 7 for running a model of the overall system, including maintaining an up-to-date schedule of all print jobs on the system, and for maintaining a log of all media resources (in this case paper) available to each printer 9, 11, 13. The application program ensures that suitable media resources are provided for the printers 9, 11, 13 and/or that print jobs are allocated to printers where appropriate media resources are available (if possible). The full operation of the application program will be described further below. A local printer 35 is connected to the stock control computer 7 and is used to generate order forms for acquiring new media resources from an external supplier 37. An Internet link 39 is also provided between the stock control computer 7 and the external supplier, to facilitate on-line electronic ordering of media resources.

As mentioned above, an application program is stored on the stock control computer 7 for running a model of the overall system. The application program actually runs two sub-models. The first sub-model comprises an up-to-date schedule of all print jobs on the system, that is all pending print jobs currently stored on the spoolers (not shown) of the computers 3, 5, 7 (bearing in mind that the stock control computer 7 can also be used to generate print jobs), and pending print jobs stored in local memories (not shown) of the printers 9, 11, 13. Each print job is defined by its PDL and JDL, the first sub-model being concerned mainly with the latter. The information stored in the schedule is (a) the number of copies to be printed; (b) the type of paper to be used; (c) the type of finishing to be employed (if any); (c) the printer to be used (optional); (d) the latest time for printing (optional); and (e) the priority level assigned to the print job (optional). The first sub-model is a 'schedule' in that it lists the print jobs in order of printing (effectively, three parallel lists are maintained, one for each printer 9, 11, 13). The "schedule" listing the printing order is formed using the information in (d) which may be specified by a customer. If no time information is provided, the print job can be placed anywhere in the schedule. Regarding (e), this is used to indicate the importance of the print job, which may vary according to a number of factors. As an example, a print job requested by a large client may attract higher priority than a new individual client. Priority is indicated here using the labels "high", "medium" or "low".

The second sub-model keeps an up-to-date record of the status of each paper tray 17, 19, 21, 23, 25, 27 which includes not only the amount of paper stored in each tray, but whether there are problems with the trays, such as paper jams.

The first and second sub-models are kept up-to-date by means of frequent monitoring and updating of the models according to new events occurring, such as the occurrence of a new print job, an event on the network 1, the input of more paper etc. By means of frequent feedback, a good reflection of the actual system state is achieved. If processing power is an issue, it may be preferable to 'sample' the status of the system at less frequent intervals, although accuracy may be compromised. In the context of this invention, the term "up-to-date" is intended to cover situations where updating is performed to reflect the changing status of the overall system.

Figure 2:
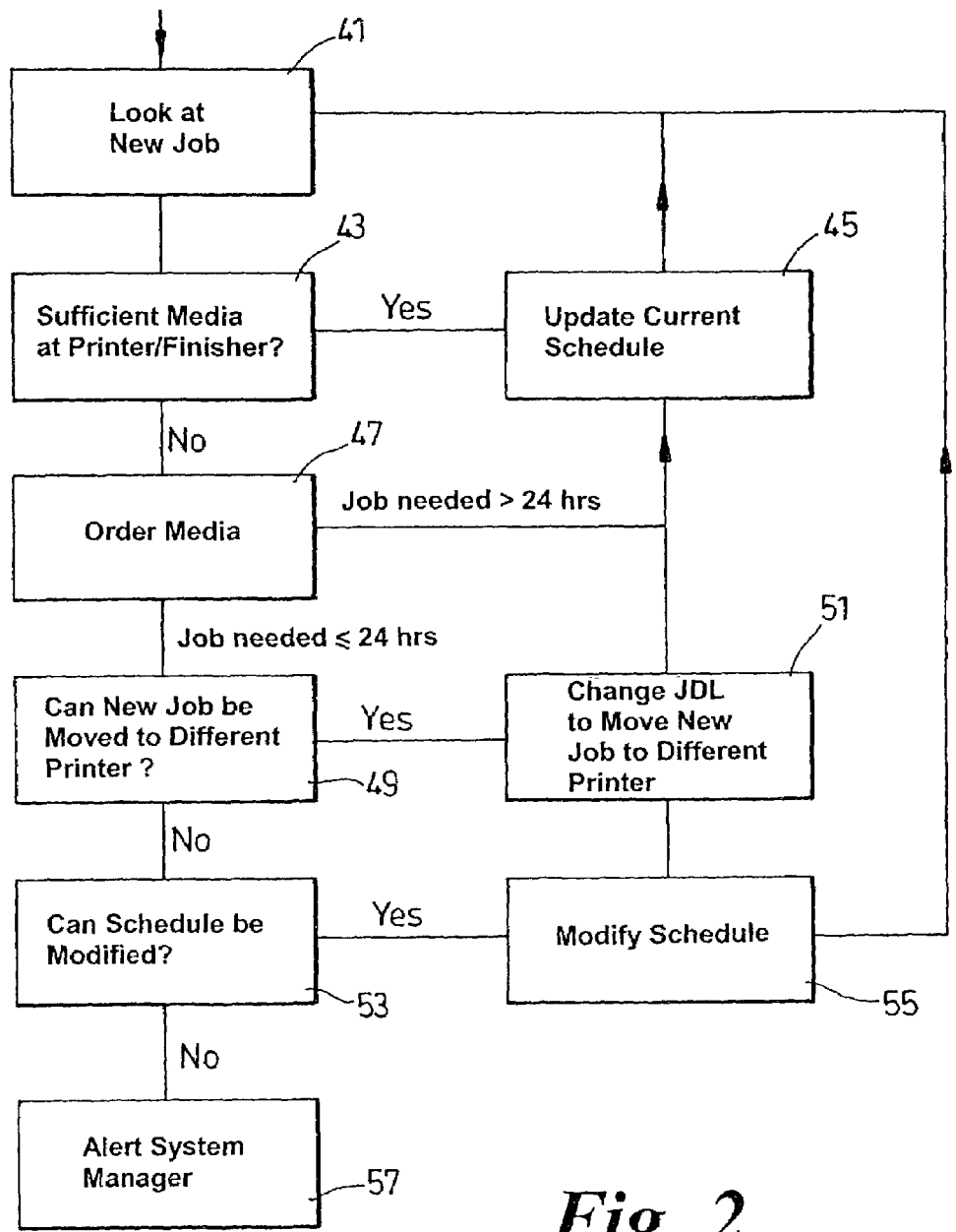
FIG. 2 is a flow diagram of a preferred method of maintaining print sources in the print system of FIG. 1.

The overall operation of the application program (apart from maintaining the first and second sub-models, described above) is summarised in FIG. 2. Referring to FIG. 2, the initial step 41 is to look at, or monitor, any new print job introduced on the network 1. In the next step 43 the application program determines whether there are sufficient media resources for performing the new print job. This is performed on the basis of the current state of the paper (or tray) of the printer specified in the JDL of the new print job (assuming a printer is specified), and the pending print jobs currently present on the system. So, for example, if there are six pending jobs for printing on the first printer 9, each one requiring 200 copies, and if there are only 1300 sheets of paper in the 100 gram paper tray 17, then it will only be possible to print a new print job to printer 9 on 100 gram paper if 100 copies or less are required. If sufficient media resources are available the current schedule is updated in step 45 to include the new print job, the schedule remaining otherwise unaltered.

If sufficient media resources are not available, in step 47, new media resources are ordered. This may be performed by automatically generating an order form from the local printer 35 with the appropriate media resources specified, or by making an on-line order via the Internet connection 39. If the new job is required more than twenty-four hours after the current time, then the new print job is simply added to the schedule at step 45 and the process repeats. This choice of twenty-four hours is made on the assumption that the newly ordered media resources will be delivered within this period and so will be present at the appropriate printer 9, 11, 13 prior to the time at which the new print job is to be processed. Of course, the figure of twenty-four hours may be varied as appropriate.

If the new print job is required to be processed within twenty-four hours of the current time, then in step 49 a determination is made as to whether the new print job can be allocated to a different printer which does have sufficient media resources. This allocation will depend on the JDL of the new print job. For example, if the JDL specifies that string binding is required, then only the second printer 11 will be suitable. If a different printer allocation is possible, in step 51 the JDL of the new print job is modified to reflect the change and the schedule is updated in step 45 to reflect the new print job.

If it is not possible to allocate the new print job to a different printer 9, 11, 13, then in step 53 it is determined whether the schedule can be modified. This essentially involves determining whether other pending print jobs can be modified or allocated to different printers such that the new print job can be processed to meet the requirements in the JDL, i.e. to meet its specified time for printing, the paper type etc. In this step, the priority level can be used to prioritise certain print jobs over others. Thus, if the new print job is of a "high" priority level, this job may be swapped with a pending print job having a "low" priority level. If modification is performed, the schedule is modified in step 55 and the process carries on as before.

If it is determined that the schedule cannot be suitable modified, e.g. since all jobs have a high priority, then in step 57, an alert is sent to the system manager informing of the situation.

All the processing which is performed to carry out the steps shown in FIG. 2 is done in super real-time. In this respect, it will be appreciated that since the application program is essentially running, and using a computer model of a physical system (the print system) the operation of the application program can be performed, and the results used, much faster than the actual print system can operate.

Two specific examples will now be briefly described. The examples are relatively simple and are intended to be illustrative.

EXAMPLE 1

| Status of Paper Trays | |
| --- | --- |
| 100 gram paper tray 17 | 1000 sheets present |
| 250 gram paper tray 19 | 400 sheets present |
| 100 gram paper tray 21 | 1000 sheets present |
| 250 gram paper tray 23 | 250 sheets present |
| 100 gram paper tray 25 | 1000 sheets present |
| 250 gram paper tray 27 | 70 sheets present |
| Job #1 | |
| No of Copies | 20 |
| Paper | 100 gram |
| Finishing | None |
| Printer | third |
| Time | Jan. 5, 2001 10am |
| Priority | None |
| Job #2 | |
| No of Copies | 400 |
| Paper | 100 gram |
| Finishing | None |
| Printer | third |
| Time | Jan. 5, 2001 11am |
| Priority | None |
| New Job Job #3 | |
| No of Copies | 600 |
| Paper | 100 gram |
| Finishing | glue binding |
| Printer | third |
| Time | Jan. 5, 2001 3pm |
| Priority | None |

When the new job (job #3) enters the system, say at 2 am on Jan. 5, 2001, the application program will appreciate that by the time the new job (job #3) is required to be printed, 3 pm, there will be only 580 sheets present in the 100 gram tray 25 of the third printer 13. Accordingly, there will be insufficient media resources present, and new media will be ordered (as in step 47 of FIG. 2) in the manner described above. Since the new print job is to be processed within twenty-four hours, it is determined whether the print job can be allocated to a different printer having sufficient resources (as in step 49 of FIG. 2). The first printer 9 has a glue binding finisher 29 which is required by job #3, and 100 gram paper tray 17 has 1000 sheets of paper present, and so the new print job can be allocated to the first printer 9. The JDL of job #3 is amended to specify printer #1 (as in step 51 of FIG. 2) and the job is added to the schedule (as in step 45 of FIG. 2).

EXAMPLE 2

| Updated Status of Paper Trays | |
|---|---|
| 100 gram paper tray 17 | 400 sheets present |
| 250 gram paper tray 19 | 400 sheets present |
| 100 gram paper tray 21 | 1000 sheets present |
| 250 gram paper tray 23 | 250 sheets present |
| 100 gram paper tray 25 | 580 sheets present |
| 250 gram paper tray 27 | 70 sheets present |
| Job #4 | |
| No of Copies | 200 |
| Paper | 250 gram |
| Finishing | none |
| Printer | first |
| Time | Jan. 5, 2001 4pm |
| Priority | low |
| Job #5 | |
| No of Copies | 170 |
| Paper | 250 gram |
| Finishing | none |
| Printer | first |
| Time | Jan. 5, 2001 5pm |
| Priority | low |
| New Job Job #6 | |
| No of Copies | 100 |
| Paper | 250 gram |
| Finishing | glue binding |
| Printer | first |
| Time | Jan. 5, 2001 6pm |
| Priority | high |

When the new job (job #6) enters the system, say at 3 am on Jan. 5, 2001, the application program will appreciate that, by the time the new job (job #6) is required to be printed, 6 pm, there will be only thirty sheets present in the 250 gram tray 19 of the third printer 13. Accordingly, there will be insufficient media resources present, and new media will be ordered (as in step 47 of FIG. 2) in the manner described above. Since the new print job is to be processed within twenty-four hours, it is determined whether the print job can be allocated to a different printer having sufficient resources (as in step 49 of FIG. 2). Whilst the third printer 13 has a glue binding finisher 33 which is required by job #6, the 250 gram paper tray 27 has only seventy sheets of paper present, and so the new print job cannot be allocated to the third printer 13. Accordingly, the next issue is whether the schedule can be modified (as in step 53 of FIG. 2) keeping job #6 at the third printer 13. Job #6 has a high priority whilst job # 5 has a low priority. Accordingly, job #6 can be moved to the slot occupied by job #5, that is, at 5 pm, and so there will be 200 sheets present at this time which is sufficient for job #6. Job #5 requires 170 sheets of paper but no finishing, and so can be moved to the second printer 11 where 250 gram paper tray 23 has 250 sheets present. The schedule is modified (as at step 55 of FIG. 2) which also involves the modification of the JDL for job #5 so that the second printer 31 is specified.

At the time when the new media resources (ordered at step 47 of FIG. 2) arrive and are loaded into the appropriate print trays, the model will of course be updated to reflect this fact.

The method by which an assessment is made as to whether the schedule can be modified, and how the schedule is modified, is described above for a simple example. In more complex situations, possibly involving a large number of pending print jobs sent to a large number of printers, it may be necessary to use a more complex algorithm or method. One possible method is summarised in FIG. 3, in which the application program runs a simulation program to predict the likely result of applying different schedule modifying operations.

Figure 3:
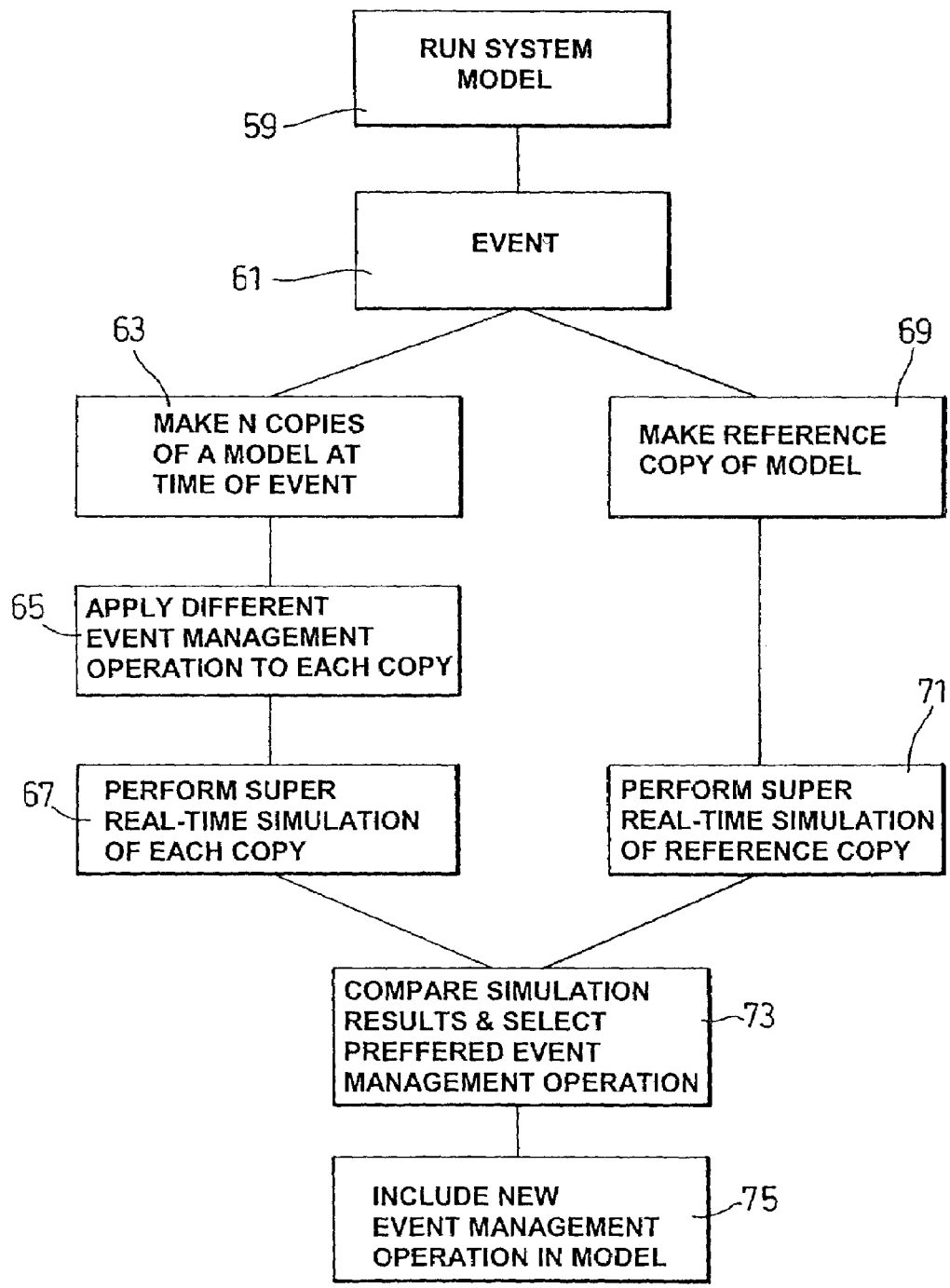
FIG. 3 is a flow diagram of a possible method of determining how a print schedule for the system of FIG. 1, shall be modified.

Referring to FIG. 3, in an initial step 59, the system model is running, i.e. to maintain an up-to-date model of the computer network 1. Step 61 represents the occurrence of an event on the computer network 1, in this case a new print job. At this time, in step 63, the application program operates to make a predetermined number of copies of the current state of the system model, say, ten copies, which represent a "snapshot" of the system at the instant in time when the new print job entered onto the system model. At the same time, in step 69, a further reference copy of the system model's current state is taken. Next, in step 65, a different event management operation is applied to each of the ten copies of the system state taken in step 63. These event management operations effectively comprise alternative options or strategies for dealing with the occurrence of the event, and may be specified manually, or may be provided as a list of predefined options which are selected from a pull-down menu. Here, the different event management operations will be concerned with making an alteration to the schedule.

In step 67, a super real-time simulation is performed for each of the different copies (to each of which has now been applied a respective event management operation). This simulation generates a set of prediction data representing a predicted end-state of the system as a result of each event management operation being applied. The simulation is performed in 'super real-time' in the sense that the simulation can be completed at a much faster rate that the actual events in the computer network 1 will occur (hence, it is a prediction of the future state of the computer network 1). In step 71, a super real-time simulation is also performed on the reference copy of the model taken in step 69. The resultant set of prediction data is used to represent the predicted end-state of the computer-network 1 (up to the point that new input is required) had the new print job not occurred.

The simulation steps 67, 71 are performed using conventional system simulation algorithms which use statistical data (usually acquired and averaged over many thousands of previous operations).

In step 73, one of the event management operations is selected based on a predefined "oracle" of selection criteria. This is performed on the basis of comparing the results from each simulation performed in step 67 with the result of the simulation performed in step 71, i.e. on the reference copy of the model. Finally, in step 75 the selected event management operation is used in the actual computer network 1 which thus becomes modified. Accordingly, the selected event management operation is incorporated into the system model which continues to operate as before. The 'oracle' mentioned above defines selection criteria for selecting one of the event management operations over the others. The criteria might simply allow high priority jobs to be placed in the schedule prior to low priority jobs on the same printer. Alternatively, the criteria might allow some medium or low priority jobs to be completed after their specified time in the schedule, but no later than, say, one hour after the scheduled time.

In summary, when a new print job is received on the computer network 1, the application program on the stock control computer attempts to ensure that appropriate media resources are available for processing that print job. This is performed by ordering new media resources, moving the print job to a different printer (if the print job is to be processed within a relatively small amount of time) where appropriate media resources are available, and even by changing the current schedule of print jobs if this can allow the print job to processed.

While there has been described and illustrated a specific embodiment of the invention, it will be clear that variations in the details of the embodiment specifically illustrated and described may be made without departing from the true spirit and scope of the invention as defined in the appended claims.

The invention claimed is:

1. A method of assisting in the maintenance of media resources in a print system, the print system comprising a plurality of printer stations connected to at least one computer system by a computer network, wherein the method comprises: maintaining a first computer model representing print jobs which are to be processed on the print system at some future time, the first computer model including job data relating to the media resource requirements of each of the print jobs and a schedule of print jobs of the plurality of printer stations; maintaining a second computer model representing the up-to-date state of media resources present at each of the plurality of printer stations; determining if one or more media resources specified in the job data will be available for the print jobs, based on analysis of the job data in the first computer model and the media resources represented in the second computer model; generating a computer notification in the event that one or more media resources will not be available for one or more of the print jobs, the notification acting as a prompt to acquire new media resources; modifying the schedule in response to a change in the print system, the modification of the schedule comprising: making N copies of at least one of the models at the time the change in the print system occurs, wherein N is greater than one, applying a different simulated event management operation to each of said N copies to generate N predicted first end states of the print system, predicting a second end state of the print system as if the change in the print system had not occurred, and changing the schedule based on the first end state that is most similar to the second end state.

2. A method according to claim 1 wherein the computer notification is automatically generated.

3. A method according to claim 1, wherein the first computer model includes a schedule specifying an ordered list of print jobs for processing at particular times, the method further comprising the step of determining whether the or each media resource specified in the job data will be available for each print job, at the time specified for processing each print job, in the schedule.

4. A method according to claim 3, wherein, in the event of a notification being generated indicating that the or each media resource required for a print job will be unavailable at the scheduled processing time for that print job, the method further comprises altering the schedule so that the print job is processed at an earlier time when the or each required media resource will be available.

5. A method according to claim 4, wherein each print job has an associated priority label indicating the relative importance of the print job, the step of altering the schedule comprising placing print jobs having a priority label indicating greater relative importance, prior to print jobs having a priority label indicating less relative importance, in the schedule.

6. A method according to claim 3, wherein the print data further specifies a particular printer station at which each print job is to be processed, and wherein, in the event of a notification being generated indicating that the or each media resource required for a print job will be unavailable at the scheduled processing time for that print job, the method further comprises altering the print data for that print job to specify a different printer station at which the or each required media resource will be available at the scheduled processing time.

7. A method according to claim 1, wherein the method further comprises inputting the automatically generated computer notification to a stock control application program.

8. A method according to claim 7, wherein the stock control application program includes an electronic ordering facility that responds to the computer notification by automatically ordering media resources.

9. A method according to claim 7, wherein the stock control application program includes a distribution facility that generates a plan of where particular media resources should be distributed.

10. A method according to claim 1, wherein the step of determining if one or more media resources specified in the job data will be available for the print jobs is performed in super real-time.

11. A computer-readable medium storing a computer program for maintaining media resources in a print system having at least one computer system and a plurality of printer stations the storing arrangement being adapted to be used at the at least one computer system, the computer program comprising computer readable instructions for causing the computer system to perform the steps of: maintaining a first computer mode representing print jobs which are to be processed on the print system at some future time, the first computer model being adapted to include job data relating to the media resource requirements of each print job and a schedule of print jobs of the plurality of printer stations; maintaining a second computer model adapted to represent the media resources present at each of the plurality of printer stations; determining if one or more media resources specified in the job data will be available for one or more of the print jobs, based on analysis of the job data in the first computer model and the media resources represented in the second computer model; and automatically generating a computer notification in the event that one or more media resources will not be available for one or more of the print jobs; modifying the schedule in response to a change in the print system, the modification of the schedule comprising: making N copies of at least one of the models at the time the change in the print system occurs, wherein N is greater than one, applying a different simulated event management operation to each of said N copies to generate N predicted first end states of the print system, predicting a second end state of the print system as if the change in the print system had not occurred, and changing the schedule based on the first end state that is most similar to the second end state.

12. A computer arrangement for controlling a print system including a plurality of printer stations, the computer arrangement being adapted to be connected to the printers by a computer network, wherein the computer arrangement is arranged to: (a) maintain a first computer model representing print jobs which are to be processed on the print system at some future time, the first computer model being adapted to include job data relating to the media resource requirements of each print job and a schedule of print jobs of the plurality of printer stations; (b) maintain a second computer model adapted to represent the media resources present at each of the plurality of printer stations; (c) determine whether one or more media resources specified in the job data will be available for the print jobs, based on analysis of the job data in the first computer model and the media resources represented in the second computer model; and (d) automatically generate a computer notification in the event that one or more media resources will not be available for one or more of the print jobs; modifying the schedule in response to a change in the print system, the modification of the schedule comprising: making N copies of at least one of the models at the time the chance in the print system occurs, wherein N is greater than one applying a different simulated event management operation to each of said N copies to generate N predicted first end states of the print system, predicting a second end state of the print system as if the change in the print system had not occurred, and changing the schedule based on the first end state that is most similar to the second end state.

13. A method according to claim 1, wherein different ones of the plurality of print stations have different capabilities, and the second computer model is maintained in accordance with the different capabilities of the different ones of the plurality of print stations.

14. A computer-readable medium according to claim 11 wherein different ones of the plurality of print stations have different capabilities, and the computer readable instructions are arranged for causing the computer system to maintain the second computer model and in accordance with the different capabilities of the different ones of the plurality of print stations.

15. A computer arrangement according to claim 12, wherein different ones of the plurality of print stations have different capabilities, and the second computer model is maintained in accordance with the different capabilities of the different ones of the plurality of print stations.

16. The computer arrangement of claim 12 in combination with the print system.

17. A method according to claim 1, wherein the first model is maintained to provide an up to date schedule of all pending print jobs stored on print spools for the printer stations and pending print jobs stored in local memories of the printer stations.

18. A computer-readable medium according to claim 11, wherein the computer readable instructions are arranged for causing the computer system to maintain the first computer model and to provide an up to date schedule of all pending print jobs stored on print spools for the printer stations and pending print jobs stored in local memories of the printer stations.

19. The computer arrangement of claim 12 wherein the first model is maintained to provide an up to date schedule of all pending print jobs stored on print spools for the printer stations and pending print jobs stored In local memories of the printer stations.

20. A method of modifying a printing schedule of a print system in response to a change in the print system, the print system including plural print sections, the method comprising: making N copies of a model of the print system at the time the change in the print system occurs, wherein N is greater than one, applying a different simulated event management operation to each of said N copies to generate N predicted first end states of the print system, predicting a second end state of the print system as if the change in the print system had not occurred, and changing the schedule based on the first end state that is most similar to the second end state.

21. The method of claim 20 wherein the change in the print system includes a new print job for the print system.

22. The method of claim 1 wherein the change in the print system includes a new print job for the print system.

23. The medium of claim 11 wherein the change in the print system includes a new print job for the print system.

24. The computer arrangement of claim 12 wherein the change in the print system includes a new print job for the print system.

25. The method of claim 20 wherein the similarity of the first and second end states is based on predefined selection criteria.

26. The method of claim 1 wherein the similarity of the first and second end states is based on predefined selection criteria.

27. The medium of claim 11 wherein the similarity of the first and second end states is based on predefined selection criteria.

28. The computer arrangement of claim 12 wherein the similarity of the first and second end states is based on predefined selection criteria.

* * * * *